(12) United States Patent
Jin et al.

(10) Patent No.: US 11,513,369 B2
(45) Date of Patent: Nov. 29, 2022

(54) MAGNETIC EYEGLASSES ATTACHMENT COMPRISING DECORATIVE ELEMENTS AND/OR FUNCTIONAL ELEMENTS INCLUDING LENSES AND METHODS OF PRODUCING SAME

(71) Applicants: Jing Jin, WenZhou (CN); Hui Jin, WenZhou (CN); Renxin Peng, XinYang (CN)

(72) Inventors: Jing Jin, WenZhou (CN); Hui Jin, WenZhou (CN); Renxin Peng, XinYang (CN)

( * ) Notice: Subject to any disclaimer, the term of this patent is extended or adjusted under 35 U.S.C. 154(b) by 232 days.

(21) Appl. No.: 16/612,306

(22) PCT Filed: Mar. 21, 2018

(86) PCT No.: PCT/CN2018/079775
§ 371 (c)(1),
(2) Date: Nov. 8, 2019

(87) PCT Pub. No.: WO2018/205750
PCT Pub. Date: Nov. 15, 2018

(65) Prior Publication Data
US 2020/0096793 A1    Mar. 26, 2020

(30) Foreign Application Priority Data
May 10, 2017 (CN) .......................... 201720510476.9

(51) Int. Cl.
*G02C 11/02* (2006.01)
(52) U.S. Cl.
CPC .......... *G02C 11/02* (2013.01); *G02C 2200/02* (2013.01)

(58) Field of Classification Search
CPC ... G02C 9/00; G02C 9/02; G02C 9/04; G02C 11/02; G02C 2200/02; G02C 1/00; G02C 11/10
USPC .......................... 351/47, 48, 57, 58, 44, 158
See application file for complete search history.

(56) References Cited

U.S. PATENT DOCUMENTS

| | | | | |
|---|---|---|---|---|
| 4,958,923 A | * | 9/1990 | Rosenson | G02C 5/146 351/52 |
| 5,181,051 A | * | 1/1993 | Townsend | G02C 11/02 351/158 |
| 5,739,959 A | * | 4/1998 | Quaglia | G02B 3/14 359/666 |

(Continued)

FOREIGN PATENT DOCUMENTS

| | | |
|---|---|---|
| CN | 1117593 A | 2/1996 |
| CN | 203433217 U | 2/2014 |

(Continued)

OTHER PUBLICATIONS

International Search Report from related PCT application PCT/CN2018/079775 dated May 30, 2018 (5 pages).

(Continued)

*Primary Examiner* — Collin X Beatty
(74) *Attorney, Agent, or Firm* — Zeman-Mullen & Ford, LLP

(57) ABSTRACT

The present invention provides magnetic eyeglasses attachments comprising decorative elements and/or functional elements including lenses. Also provided are methods of producing the magnetic eyeglasses attachments.

26 Claims, 2 Drawing Sheets

(56) References Cited

U.S. PATENT DOCUMENTS

| | | | |
|---|---|---|---|
| 6,412,942 B1* | 7/2002 | McKenna | G02C 9/00 |
| | | | 351/41 |
| 6,893,124 B1 | 5/2005 | Kurtin | |
| 7,040,750 B2* | 5/2006 | Smith | G02C 9/00 |
| | | | 351/47 |
| 2005/0099588 A1 | 5/2005 | Helpern et al. | |
| 2006/0055878 A1 | 3/2006 | Yee | |
| 2009/0213282 A1 | 8/2009 | Burlingame et al. | |
| 2016/0026003 A1* | 1/2016 | Sheldon | G02C 9/04 |
| | | | 351/57 |
| 2016/0026004 A1* | 1/2016 | Sheldon | G02C 9/04 |
| | | | 351/57 |

FOREIGN PATENT DOCUMENTS

| | | | | |
|---|---|---|---|---|
| KR | 20140124697 A * | 10/2014 | | G02C 11/02 |
| WO | WO-2013064710 A1 * | 5/2013 | | G02C 1/00 |
| WO | WO-2014012451 A1 * | 1/2014 | | G02C 11/02 |

OTHER PUBLICATIONS

Written Opinion of the International Searching Authority from related PCT application PCT/CN2018/079775 dated May 30, 2018 (4 pages).

\* cited by examiner

MAGNETIC EYEGLASSES ATTACHMENT COMPRISING DECORATIVE ELEMENTS AND/OR FUNCTIONAL ELEMENTS INCLUDING LENSES AND METHODS OF PRODUCING SAME

RELATED APPLICATIONS AND PRIORITY CLAIM

This application is the U.S. national phase (national stage entry) of International Application No. PCT/CN2018/0079775 filed Mar. 21, 2018, which designates the U.S. and claims priority to CN Patent Application No. 201720510476.9 filed May 10, 2017, the entire contents of each of which are hereby incorporated by reference.

FIELD OF THE INVENTION

The present invention pertains to the field of eyeglasses. In particular, the present invention pertains to magnetic eyeglasses attachments comprising decorative elements and/or functional elements including lenses

BACKGROUND OF THE INVENTION

The use of removable attachments to modify functional and/or decorative aspects of eyeglasses are known in the art. For example, auxiliary "clip-on" lenses which may be used to convert eyeglasses into sunglasses are commercially available. Clip-on auxiliary lenses typically attach to the primary eyeglasses by a mechanical mechanism and/or a magnetic mechanism.

Clip-on auxiliary lenses having a mechanical mechanism have a clip mechanism comprising clamp(s) which grip the frame of the primary lenses to connect the auxiliary lens to thereto at the circumference. Such clip-ons may be difficult to attach to the primary eyeglasses and may require both hands to attach such clip-ons to the eyeglass frames.

Clip-ons having a magnetic mechanism may have small magnet(s) which attach to magnet (s) on the frame of the primary lenses. Clip-ons with such magnetic attachment mechanisms are more easily detached from the primary frame and may detach unintentionally. In addition, given the limited attachment points with the magnetic mechanism, any bending, warping, or misshaping of the clip-on, including that associated with normal wear and tear may prevent the magnets on the clip-ons from aligning with the magnets on the primary eyeglasses and the clip-on might not attach at all or only very weakly.

In addition, the limited attachment points in either type of conventional clip-on may produce a gap between the primary and auxiliary lenses thereby allowing light to seep in between thereby causing a ghosting effect from the light reflecting between the two lenses. Furthermore, for conventional clip-ons which have a protruding clip mechanism (either mechanical or magnetic attachment mechanisms) there is the risk that the clip mechanism may scratch the primary lens when being attached. Another limitation of these conventional clip-ons is that they are not aesthetically pleasing to some consumers.

In addition to clip-on lens, removable decorative elements for eyeglasses are also known in the art. See, for example, U.S. Pat. No. 7,530,688 which teaches decorative elements magnetically attachable to eyeglasses frames. Removable decorative decals and stickers for eyeglasses are also known in the art (see for example US20150049293).

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a magnetic eyeglasses attachment comprising decorative elements and/or functional elements including lenses and methods of producing same. In accordance with an aspect of the present invention, there is provided an attachment for an eyeglasses frame comprising magnetically receptive material, said attachment comprising: a frame comprising a magnetic material, wherein said frame is shaped such that the frame magnetically couples the eyeglasses frame around the entire perimeter of each of lens in the eyeglasses.

DETAILED DESCRIPTION OF THE INVENTION

Figure 1:
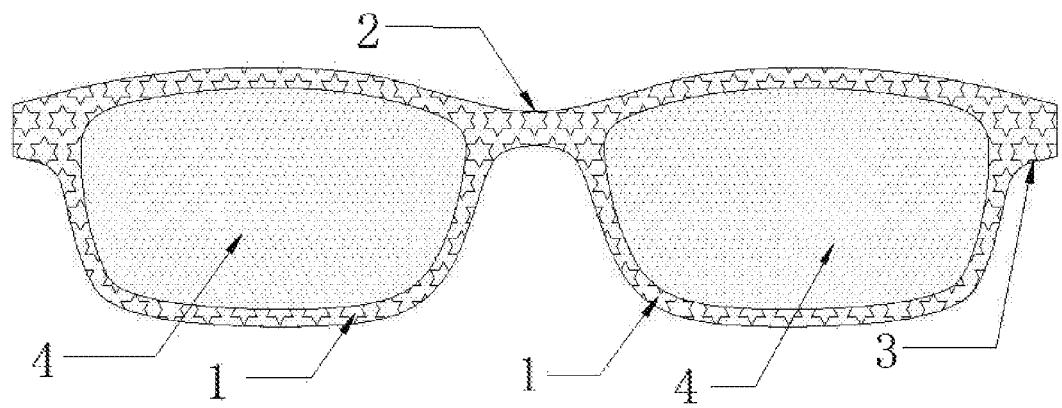
FIG. 1 provides a front view of an embodiment of the magnetic eyeglasses attachment of the present invention.

The present invention relates to magnetic eyeglasses attachments comprising decorative elements and/or functional elements including lenses. In certain embodiments of the eyeglasses attachment comprising lenses, the magnetic coupling of the eyeglasses attachment to the eyeglasses does not allow for light to seep in between and therefore prevents ghosting. Moreover, the lack of protruding parts reduces the risk of scratching the lenses of the eyeglasses during installation and allows for the insertion and removal from a pocket (i.e. shirt pocket for storage) easier.

The eyeglasses attachment of the present invention is for attachment to eyeglasses frames comprising magnetically receptive material. As used herein, magnetically receptive material refers to a material attracted to a magnet and capable of magnetically coupling to the magnet. The eyeglasses attachment of the present invention may be for attachment to the front of the eyeglasses frame (i.e. outer facing surface of the eyeglasses). When magnetically coupled to the outer facing surface of the eyeglasses, the attachment can be used to change the cosmetic look of the eyeglasses and/or provide functional changes (such as optical changes). The eyeglasses attachment of the present invention may be for attachment to the back of the eyeglasses frame (i.e. eye facing surface of the eyeglasses when worn). When magnetically coupled to the back of the eyeglasses frame, the attachment may provide functional changes (such as optical changes) but may have limited impact on the cosmetic look of the eyeglasses.

The eyeglasses frames or a portion of the eyeglasses frames for use with the attachments of the invention are constructed from or clad in magnetically receptive material. In certain embodiments, the portion of the eyeglasses includes the rims, bridge and end pieces (i.e. temples) of the frame. In certain embodiments, the portion of the eyeglasses includes the outer (front) surface of the rims, bridge and end pieces (i.e. temples) of the frame. In certain embodiments, the portion of the eyeglasses includes the inner (back) surface of the rims, bridge and end pieces (i.e. temples) of the frame. The amount of magnetically receptive material in the frames should be in an amount sufficient and positioned on the eyeglasses frames to allow the attachment to magnetically couple.

The magnetically receptive materials used in the construction of the eyeglasses frames or a portion of the eyeglasses frames include but are not limited to stainless steel that is magnetically receptive, iron, nickel and any other appropriate magnetically receptive materials. In one embodiment of the invention, the magnetically receptive material is cold drawn stainless steel, including but not limited to 304 and 305 stainless steel. In particular embodiments, the magnetically receptive material is 304 cold drawn stainless steel.

In specific embodiments, the eyeglasses frames for use with the magnetic eyeglasses attachments are made from stainless steel sheets. In specific embodiments, the eyeglasses frames for use with the magnetic eyeglasses attachments are made from stainless eye wire.

Referring to FIG. 1, in certain embodiments, the eyeglasses attachment of the present invention is shaped to essentially correspond to the shape of a portion of the frame of the eyeglasses to which they are to be attached. Accordingly, the eyeglasses attachment is shaped to essentially correspond to one or more portions including the rims, bridge and/or end pieces (i.e. temples) of the frame of the primary eyeglasses to which it is to be magnetically coupled. In certain embodiments, the eyeglasses attachment comprises a frame comprising two frame bodies (1) which is shaped to essentially correspond to the shape of rims and optionally end pieces of eyeglasses and interconnecting portion (2) which is shape to essential correspond to the bridge of eyeglasses. The interconnecting portion (2) is optionally integrally formed with the frame bodies. In certain embodiments, the eyeglasses attachment further comprises a lens (4) retained in each frame body.

The width of the frame bodies should be sufficiently wide enough to ensure the lens, if present is retained, and to allow for magnetic coupling to the eyeglasses frame. In certain embodiments, the width of the frame bodies is at least 1.5 mm. The width of the frame bodies can be as wide as desired so long as it does not prevent magnetic coupling or function of the lenses.

In certain embodiments, the eyeglasses attachment of the present invention is shaped such that it magnetically couples the eyeglasses frame around the entire perimeter of each lens in the eyeglasses. In these embodiments, the eyeglasses attachment may or may not mirror the shape of a portion of the frame of the eyeglasses to which they are to be attached. In certain embodiments, the eyeglasses attachment is shaped to magnetically couple the rims of the eyeglasses frame. In certain embodiments, the eyeglasses attachment is used to alter the shape of the eyeglasses to which it magnetically binds.

The frame of the eyeglasses attachment is composed of a magnetic material, including a composite magnetic material such as flexible magnet material. Composite magnetic materials are typically composed of a magnetic compound, including but not limited to a ferromagnetic compound such as ferric oxide mixed with a binder. A worker skilled in the art would readily appreciate that the flexibility of the magnetic material may be dependent on the binders used. In certain embodiments, the composite magnetic material should be sufficiently flexible to allow it to follow the contours of the eyeglasses frame to which it is to be magnetically coupled and thereby form a seal around the lenses/lens shield of the eyeglasses and any lenses in the magnetic attachment. This seal prevents light from seeping in between the lenses and thereby prevents ghosting.

Binders include but are not limited to nylons, resins, polyvinyl chloride and rubber. In certain embodiments, the magnetic material is rubber magnetic material.

In specific embodiments, the magnetic compound is neodymium iron boron (NdFeB) magnet magnetic material and the binder is chlorinated polyethylene (CPE) material.

A worker skilled in the art would readily appreciate that the magnetic material can have a range of magnetic strengths. The magnetic strength of the frame of the eyeglasses attachment of the present invention must be sufficient to hold the eyeglasses attachment in place on the frame of the eyeglasses when in use but also must allow for removal by the user. In certain embodiments, the magnetic strength is in the range of 600 Gauss to 1200 Gauss. In certain embodiments, the magnetic strength is about 900 Gauss.

Composite magnetic material, including rubber magnetic material, are commercially available in a number of forms including but not limited to sheets, strips, blocks, rolls, powders and compounds. A worker skilled in the art would readily appreciate appropriate methods of forming the frame of the attachment using the magnetic material. For example, the composite magnetic material may be used in a variety of manufacturing processes including but not limited to cutting, grooving, extrusion and/or injection molding processes.

In specific embodiments, the magnetic compound is neodymium iron boron (NdFeB) magnet magnetic material and the binder is chlorinated polyethylene (CPE) material. In this specific embodiment, the frame of the attachment may be produced by mixing the neodymium iron boron (NdFeB) magnet magnetic material (0.1 mm, powdered) and the chlorinated polyethylene (CPE), followed by granulating the mixture and injection molding to form the frame. After injection molding the frame is magnetized.

Optionally, the surface of the frame of the eyeglasses attachment which does not come in contact with the frame of the eyeglasses when magnetically coupled to the eyeglasses (i.e. non-contacting surface) is painted, coated, laminated, overlaid, imprinted, embellished, decorated and/or otherwise modified so long as magnetic coupling is not inhibited.

In certain embodiments, the non-contacting surface of the frame of the eyeglasses attachment comprises an overlay. Various overlays may be used so long as the overlay does not inhibit magnetic coupling of the attachment to the frame of the eyeglasses. Exemplary non-limiting examples include a vinyl (such as polyvinyl chloride (PVC)), a polyester (such as polyethylene terephthalate (PET), a plastic, an acetate, a metal (such as titanium or aluminum), a cloth, a paper and a natural material (such as leather, fur or wood). In certain embodiments, the overlay is selected from the group of PVC, PET, leather, carbon fiber, cloth and wood veneer. In specific embodiments, the overlay is PET having a printed surface pattern. A worker skilled in the art would readily appreciate appropriate methods of surface bonding the overlay to the magnetic material.

Optionally, the overlay is further imprinted with a pattern or design. Methods of imprinting are known in the art and include for example screen printing (also preferred to as silk-screen, screen, serigraphy, and serigraph printing) or digital printing techniques.

Figure 2:
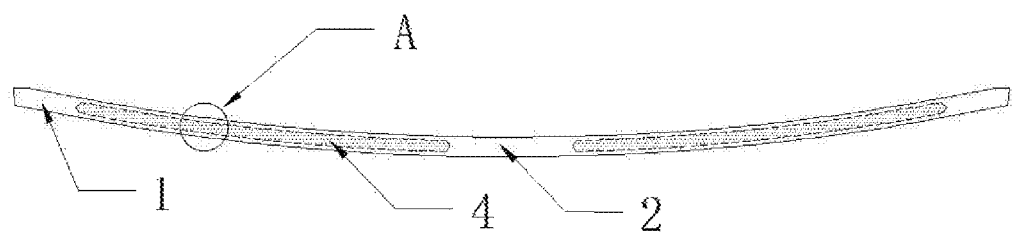
FIG. 2 provides a top view of an embodiment of the magnetic eyeglasses attachment of the present invention with a cut out to show position of the lenses in the frame body of the magnetic eyeglass attachment.
Figure 3:
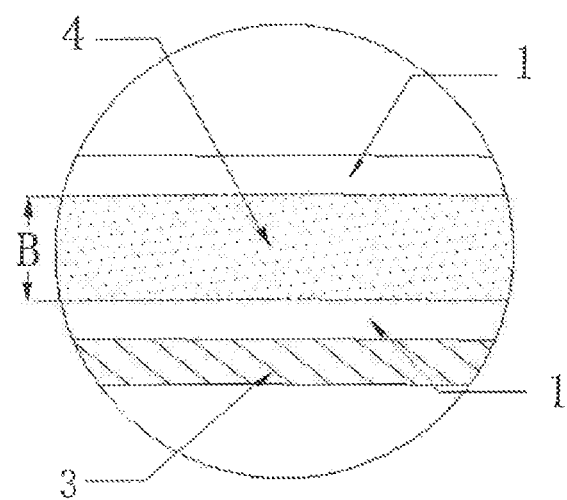
FIG. 3 provides an enlarged cross-sectional view of section A in FIG. 2.

Referring to FIGS. 2 and 3, in certain embodiments, the eyeglasses attachment further comprises lenses (4). The lenses may be two separate lenses or a lens shield which comprises two lenses connected by a central bridge portion. In certain embodiments, the lens shield is a unitary molded structure. The two lenses/lens shield of the eyeglasses attachment are positioned in the eyeglasses attachment such that when the eyeglasses attachment is magnetically coupled to the eyeglasses frame, the lenses of the eyeglasses attachment and the lenses of the eyeglasses are in alignment. The lenses may be fashion lenses only or provide a function. The function may be an optical function and/or non-optical function. Optical functions 10 include but are not limited to light reduction and 3D. Non-optical functions include but are not limited to for example UV reduction, safety and impact resistance. Accordingly, exemplary lenses/lens shield include but not limited to 3D, polarized, coloured/tinted, photochromic, mirrored, anti-reflective (i.e. anti-glare), and/or impact resistant lenses.

The lenses may be constructed from a variety of materials and have a variety of thicknesses so long as the material does not prevent magnetic coupling of the attachment to the frame of the eyeglasses. Exemplary materials include but are not limited to the including but not limited to glass, polyurethane, polycarbonate and acrylic. The lens thickness may be dependent on the material of the lens and the purpose of the lens. In certain embodiments, the lens may have a thickness of 0.34 mm to 1.1 mm thick. In certain embodiments, the thickness of the lens is no greater than 0.74 mm. Optionally, the lens are coated. Non-limited examples of coatings include hydrophobic coatings, anti-scratch coatings, anti-fog coatings and mirrored coatings.

The eyeglasses attachment may be designed for particular tasks. As an illustrative example only, the eyeglasses attachment may be designed for driving, a particular sport or for use with a computer. In certain embodiments, the eyeglasses attachment further comprises a side shield. Such a side shields may block light from the side and/or offer side protection (for example from wind or dust). This may be useful for particular activities (i.e. particular sports or driving).

The eyeglasses attachment of the present invention may be sold individually, as a set of multiple attachments or as part of a kit. The kit may also include additional components, such as magnetic attachments for the templates of the eyeglasses. The eyeglasses attachment may be designed for a specific type or pair of eyeglasses frames or may be designed to be used with standard frames which have magnetically receptive material in the frames. Accordingly, the eyeglasses attachment of the present invention may be sold with eyeglasses. In certain embodiments, the eyeglasses are corrective eyeglasses, such as prescription eyeglasses. In other embodiments, the eyeglasses are not corrective and are only used as a mounting for the eyeglasses attachment.

In some embodiments, the eyeglasses attachment of the present invention is sold with and/or is for use with frames with no lenses.

Figure 4:
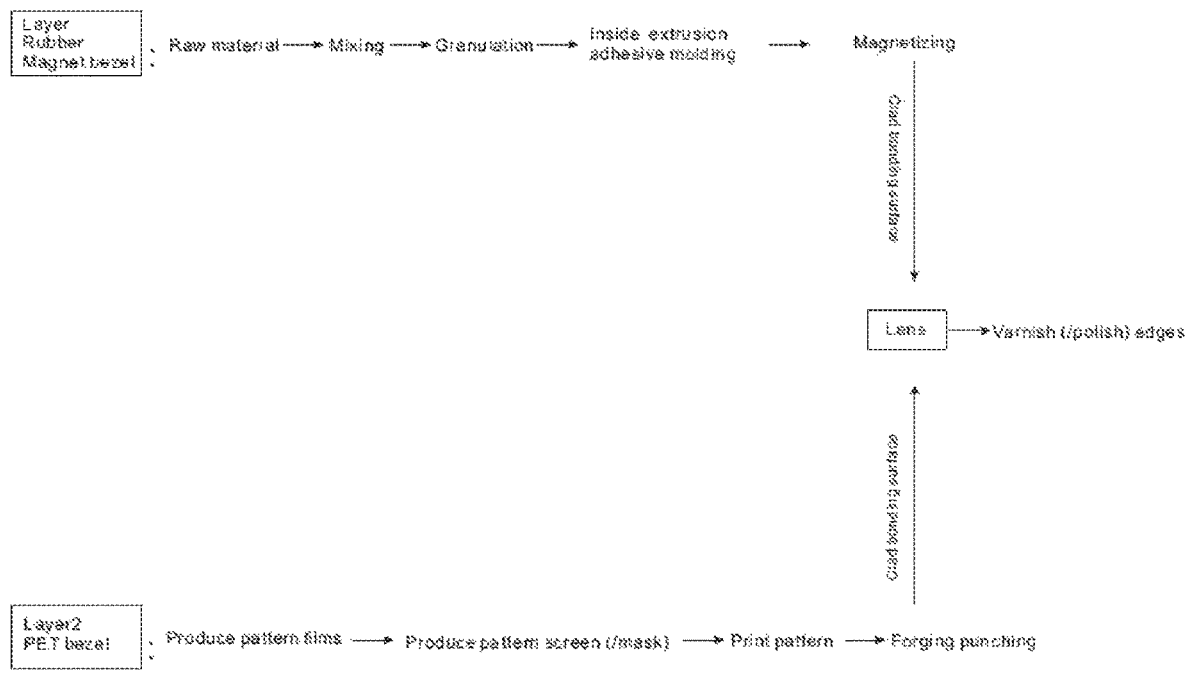
FIG. 4 provides an overview of a non-limiting exemplary method of manufacturing an embodiment of the magnetic eyeglasses attachment of the present invention.

Also provided are methods of manufacturing the eyeglasses attachment of the present invention. See for example the method set forth in FIG. 4.

Although the invention has been described with reference to certain specific embodiments, various modifications thereof will be apparent to those skilled in the art without departing from the spirit and scope of the invention. All such modifications as would be apparent to one skilled in the art are intended to be included within the scope of the following claims.

The embodiments of the invention in which an exclusive property or privilege is claimed are defined as follows:

1. A removable attachment for eyeglasses, the eyeglasses including eyeglasses lens(es) mounted in an eyeglasses frame, the eyeglasses frame comprising magnetically receptive material, said attachment comprising:
   an attachment frame comprising a flexible composite magnetic material, said composite magnetic material comprising a magnetic compound and a binder, and
   attachment lens(es) mounted in said attachment frame which, when the attachment is magnetically coupled to the eyeglasses frame, are in alignment with corresponding eyeglasses lens(es),
   wherein said attachment frame is shaped such that the attachment frame is configured to magnetically couple to the eyeglasses frame around an entire perimeter of the eyeglasses lens(es) and an entire perimeter of the attachment lens(es), and wherein said attachment frame when magnetically coupled to the eyeglasses frame forms a seal around the entire perimeter of the eyeglass lens(es) and the entire perimeter of the attachment lens(es) such that the seal prevents light from seeping in between the eyeglasses lens(es) and the attachment lens(es).

2. The attachment of claim 1, wherein said magnetic compound is a ferromagnetic compound and said binder is a polyvinyl chloride or a rubber.

3. The attachment of claim 1, wherein said flexible composite magnetic material is a rubber magnet.

4. The attachment of claim 1, wherein an overlay is bonded to at least one surface of the attachment frame such that the overlay does not contact the eyeglasses when the attachment frame is magnetically coupled to the eyeglasses frame around the entire perimeter of the eyeglasses lens(es) and the entire perimeter of the attachment lens(es).

5. The attachment of claim 4, wherein the overlay is selected from the group consisting of (a) PVC, (b) PET, (c) leather, (d) carbon fiber, (e) cloth and (f) wood veneer.

6. The attachment of claim 1, wherein said attachment lens(es) are (1) polarized, or (2) 3D.

7. The attachment of claim 6, wherein the attachment comprises two interconnected attachment lenses.

8. The attachment of claim 6, wherein a thickness of the attachment lens(es) is not greater than 0.74 mm.

9. The attachment of claim 1, wherein the attachment comprises two interconnected attachment lenses.

10. The attachment of claim 1, wherein a thickness of the attachment lens(es) is not greater than 0.74 mm.

11. The attachment of claim 1, wherein said magnetic compound is neodymium iron boron and said binder is chlorinated polyethylene.

12. The attachment of claim 1, wherein said attachment frame is injection molded.

13. The attachment of claim 1, in which the attachment is paired in kit form with eyeglasses according to claim 1.

14. The attachment of claim 1, in which the attachment is in a set thereof all according to claim 1.

15. The attachment of claim 1, in which the attachment frame consists of a flexible composite magnetic material, said composite magnetic material comprising a magnetic compound and a binder.

16. A removable attachment configured for magnetic coupling to an eyeglasses frame, the eyeglasses frame including at least one eyeglass lens mounted therein, the eyeglasses frame further including a magnetic receptive material at contact interfaces with the removable attachment, the removable attachment comprising:

an attachment frame, the attachment frame comprising a flexible composite magnetic material including a magnetic compound and a binder; and at least one attachment lens, each attachment lens mounted in the attachment frame to be aligned with a corresponding one of the eyeglass lenses when the attachment frame is magnetically coupled to the eyeglasses frame;

wherein the attachment frame is shaped such that when the attachment frame is magnetically coupled to the eyeglasses frame, a seal is formed around each aligned eyeglass lens and corresponding attachment lens such that the seal prevents light from seeping in between each aligned eyeglasses lens and corresponding attachment lens.

17. The removable attachment of claim 16, in which the magnetic compound is a ferromagnetic compound and said binder is selected from a group consisting of (a) a polyvinyl chloride and (b) a rubber.

18. The removable attachment of claim 16, in which the magnetic compound is neodymium iron boron and said binder is chlorinated polyethylene.

19. The removable attachment of claim 16, in which the flexible composite magnetic material is a rubber magnet.

20. The removable attachment of claim 16, in which the attachment frame includes first and second obverse surfaces such that the first side is configured to magnetically couple to the eyeglasses frame and an overlay is bonded to the second side.

21. The removable attachment of claim 20, in which the overlay includes at least one material selected from the group consisting of (a) a polyvinyl chloride; (b) a polyethylene terephthalate, (c) leather, (d) carbon fiber, (e) woven fabric and (f) wood veneer.

22. The removable attachment of claim 16, in which the at least one attachment lens includes two interconnected lenses.

23. The removable attachment of claim 16, in which each attachment lens is not greater than about 0.74 mm in thickness.

24. The removable attachment of claim 16, in which the removable attachment is paired in kit form with an eyeglasses frame according to claim 16.

25. The removable attachment of claim 16, in which the removable attachment is in a set thereof all according to claim 16.

26. The removable attachment of claim 16, in which the attachment frame consists of a flexible composite magnetic material including a magnetic compound and a binder.

* * * * *